US006538813B1

(12) United States Patent
Magno et al.

(10) Patent No.: US 6,538,813 B1
(45) Date of Patent: Mar. 25, 2003

(54) DISPLAY SCREEN WITH METALLIZED TAPERED WAVEGUIDES

(75) Inventors: John Magno, Middletown, NJ (US); Paul A. Papanestor, Rockaway, NJ (US)

(73) Assignee: Honeywell International Inc., Morristown, NJ (US)

( * ) Notice: Subject to any disclaimer, the term of this patent is extended or adjusted under 35 U.S.C. 154(b) by 166 days.

(21) Appl. No.: 09/665,026

(22) Filed: Sep. 19, 2000

(51) Int. Cl.$^7$ ............................................. G03B 21/56
(52) U.S. Cl. ...................... 359/443; 359/460; 385/901
(58) Field of Search .................. 359/443, 453, 359/460; 385/146, 901

(56) References Cited

U.S. PATENT DOCUMENTS 3,279,314 A  * 10/1966 Miller ........................ 359/453
5,481,385 A    1/1996 Zimmerman et al. ......... 359/40
5,521,726 A  *  5/1996 Zimmerman et al. ......... 349/96
5,657,408 A  *  8/1997 Ferm et al. .................... 385/43
5,696,865 A  * 12/1997 Beeson et al. .............. 385/146
5,889,612 A  *  3/1999 Van De Ven ................ 359/453

* cited by examiner

Primary Examiner—Christopher Mahoney (57) ABSTRACT

An avionics display includes a first predefined display area for high priority information and a second predefined display area for normal priority information. A viewing screen is disposed between the avionics display and a design eye point. A first portion of the viewing screen, corresponding to the high priority information, includes metallized tapered waveguides to direct light including the normal priority information at a limited vertical viewing angle and to direct light including the high priority information at an extended vertical viewing angle.

11 Claims, 7 Drawing Sheets

FIG. 1

PRIOR ART

DISPLAY SCREEN WITH METALLIZED TAPERED WAVEGUIDES

FIELD OF THE INVENTION

The present invention relates to the field of display devices and in particular to screens that can enhance the viewing angle, especially for liquid crystal displays (LCD).

BACKGROUND OF THE INVENTION

Display devices as for example projection display devices, off screen display devices and direct view displays are known. See for example, Zimmerman et al U.S. Pat. No. 5,481,385. Such displays are used in a wide range of applications which include computer terminals, airplane cockpit displays, automotive instrument panels, televisions and other devices that provide text, graphics or video information. Conventional direct view displays as for example liquid crystal displays suffer from a number of inherent disadvantages. For example, at high viewing angles (large angles from the direction normal to the surface of the display), such displays suffer from low contrast and changes in visual chromaticity as the viewing angle changes.

For most display devices it is important that the operator can view the display at various off-axis angles. For example, in an aircraft with right and left crew seats (pilot/copilot), the pilot may need to look across the cockpit to read the copilot's displays. In this situation, it is desirable to have a large (>60 degree) off-axis viewing angle. Certain types of displays (e.g. LCDs) have a limited off-axis (<20 degrees) unless external compensation is provided.

Figure 1:
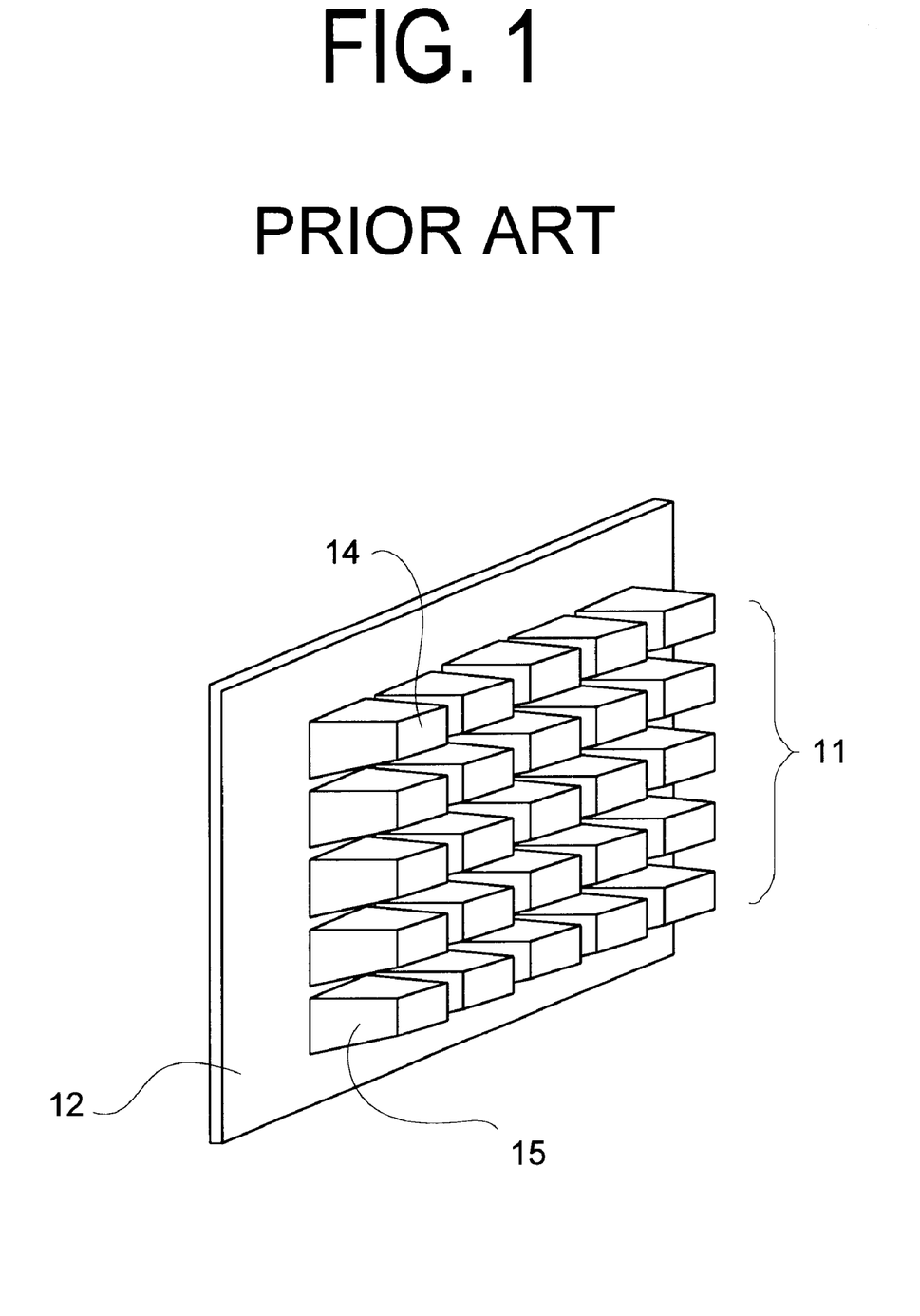
FIG. 1 shows a prior art viewing screen for a display device having a plurality of tapered waveguides on the side facing the viewer.

In Zimmerman, U.S. Pat. No. 5,481,385, issued Jan. 2, 1996, a viewing screen is placed between a liquid crystal display (LCD) and a person viewing the display. It is desirable in the art to pass collimated light through a LCD display in order to produce an image. Such collimated light has a fairly low scatter angle (approximately 5 to 10 degrees) which results in undesirable off-axis viewing for the display. The viewing screen of Zimmerman, which includes a plurality cone-shaped optical waveguides on the viewer's side of the screen, is shown in FIG. 1. The viewing screen comprises a plurality of tapered waveguides 11 that are disposed on a transparent planar substrate 12, such as glass. Each tapered waveguide has a light input surface 13 (not seen in FIG. 1) through the substrate 12, a light output surface 14 and tapered sidewalls 15. These optical waveguides are constructed from a photopolymeric material such as acrylic.

Figure 2:
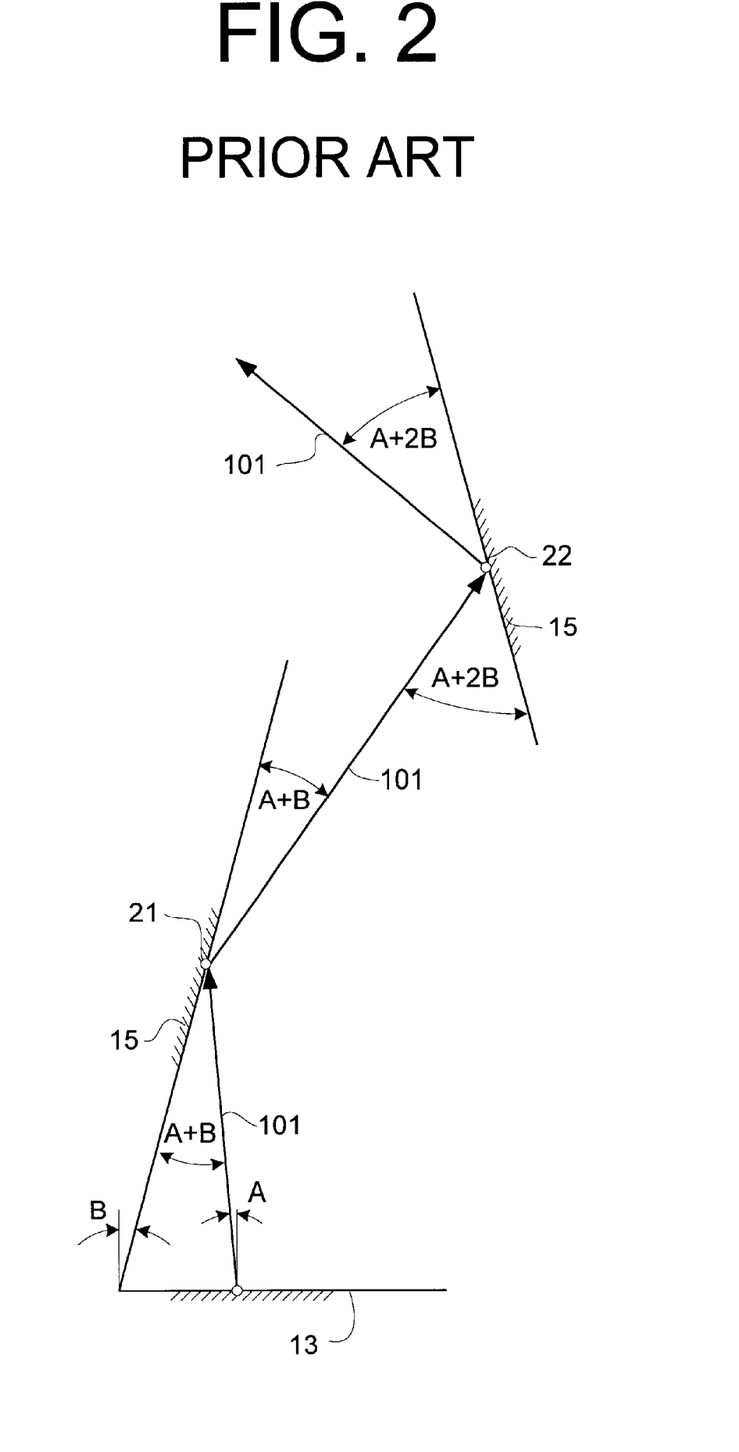
FIG. 2 shows the geometry of a light ray reflecting from the sides of a tapered waveguide of the viewing screen of FIG. 1.

FIG. 2 illustrates the internal light reflections (i.e. light path) through such a tapered waveguide. Light rays 101 enter a tapered waveguide 11 at the light input surface 13 and propagate through the tapered waveguide 11 via a number of reflections off the tapered sidewalls. At the first reflection, the scatter angle of the light ray 101 is increased from A to A+B, where B is the taper angle of the sidewall. At the second reflection 22 the scatter angle is increase to A+2B. In general the scatter angle of the light output from a tapered waveguide can be expressed as A+(n*B), where 'n' is the number of reflections from the tapered sidewalls before the light ray 101 exits the tapered waveguide 12. Note that the angle of incidence is equal to the angle of reflection for each light ray 101.

Figure 3:
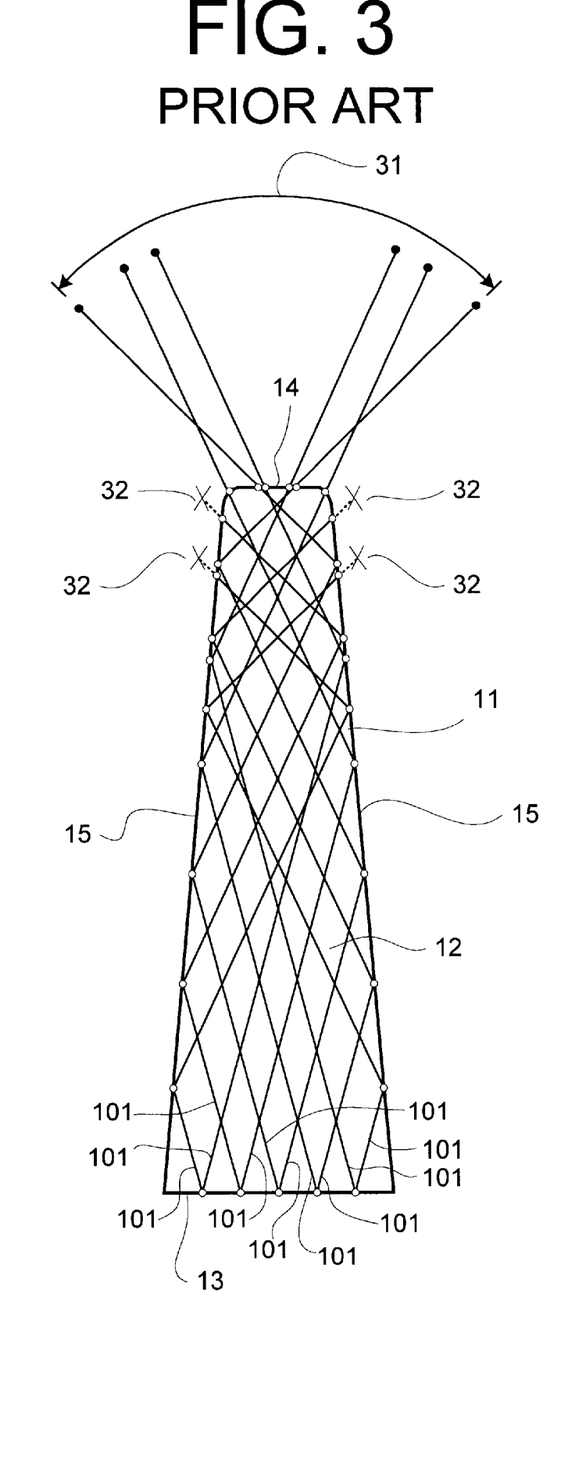
FIG. 3 shows the propagation of light rays through a tapered polymerized waveguide of the viewing screen of FIG. 1.

A transparent waveguide, such as shown by Zimmerman, propagates light though total internal reflection (TIR) in the same manner as a fiber optic cable. TIR requires that the incident angle of the light is less than a critical value determined by materiel properties of the optical medium (e.g. acrylic). FIG. 3 illustrates a plurality of light rays 101 propagating through a tapered waveguide, as taught by Zimmerman, to a output light spread angle 31. After a limiting number of reflections, the scatter angle of the light ray 101 will exceed a critical incident angle for the waveguide optical medium and the light rays will exit at side points 32 on the tapered waveguide 11 instead of reflecting from the tapered surface 15. Zimmerman teaches that it is desirable to absorb light that escapes the waveguide 11 by filling the interstitial region between the waveguides with a light absorbing material, such as lampblack.

Typically a tapered cone waveguide is constructed of an optical medium such as glass or a photopolymeric material such as acrylic. Zimmerman teaches a photopolymerization process, using ultraviolet (UV) light from a mercury (Hg) or xenon (Xe) source that is especially suitable for manufacture of a tapered cone waveguide. The exposure sandwich used mask/methanol/PET/photopolymer/clear glass top plate. The exposure sandwich was developed and then hard UV baked. A mask with 50 micron holes and 5 micron lines produces tapered cones that are 200 microns high and have tips (light exit area) that are 20 micron wide. The cones are typically fused to each other at a depth of 160 microns and have a 12-degree sidewall taper.

Light rays 101 enter the tapered cone waveguide 11 at the light input surface 13 and exit through the light output surface 14. As the light ray 101 propagates through the optical medium 12, it is reflected from the sidewalls 15. Geometry for light rays 101 at the left and right extremes of the input spread angle are illustrated. After a certain number of reflections, the light ray incidence angle exceeds the refraction index for the optical material and escapes from the waveguide as shown at 32. This results in a limited output light spread angle 31.

Certain improvements to the Zimmerman concept are known including filling the interstitial regions between the waveguides 11 with an optical medium that has a lower refractive index than the refractive index of the waveguides. However this approach will cause undesirable reflections of external light as seen by the viewer. Desired features for avionics displays include high ambient light reflection, high transmission, and asymmetrical output luminance distribution about the display normal.

SUMMARY OF THE INVENTION

Our invention provides an array of tapered cones on the viewing side of a display to increase the off-axis viewing angle. Our invention teaches metallic reflective coating is placed on the exterior of the tapered optical waveguides. In addition, the surface of the resultant metallic cone facing away from the waveguide can be processed to form a black light absorbing area facing the viewer. This black area is useful in reducing reflections as seen by the viewer.

Typical use of the invention would be a viewing angle enhancement screen for use with a conventional liquid crystal display (LCD). These LCD displays typically output collimated light (spreads approximately 5 degrees).

An asymmetrical tapered optical waveguide helps promote wider horizontal versus vertical viewing distribution. A tilted cone provides asymmetrical viewing about one axis (vertical). The metallic coated cone provides higher viewing angle.

The hollow metallic cone is a variation of the previous concept with the photopolymer removed. Preferably an overcoat would be placed on the interior metallic surface to prevent corrosion/oxidation.

The direct view display device of this invention exhibits several advantages over known devices. For example, the device of this invention has an asymmetric viewing angle that can be adjusted to match the characteristics of a liquid crystal display to the cross-cockpit viewing requirements of an aircraft.

BRIEF DESCRIPTION OF THE DRAWINGS

The invention will be more fully understood and further advantages will become apparent when reference is made to the following detailed description of the invention and the accompanying drawings in which.

DESCRIPTION OF THE INVENTION

Figure 4:
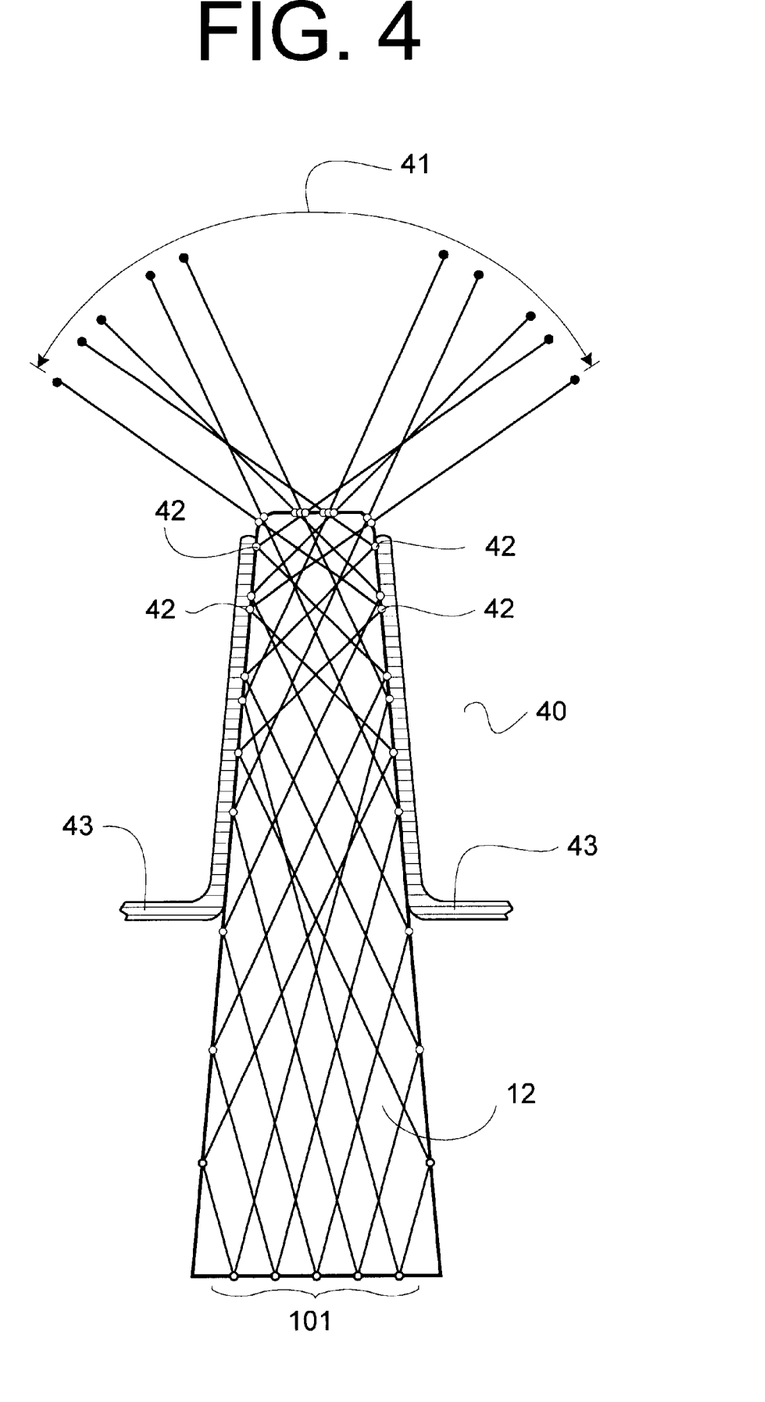
FIG. 4 shows tapered polymerized waveguide with a metallic reflection layer in accordance with the present invention.

Referring now to FIG. 4, a tapered cone waveguide 40, in accordance with our invention, is shown. Advantageously, our invention adds a metallic layer 43 to the exterior surface of the waveguide 40, particularly to the upper cone region where the incident light has a spread angle that exceeds the refraction index of the optical medium 12. The metallic coating is deposited on the exterior of the cone using, for example, chemical vapor deposition (CVD). As a light ray 101 reflects from the metallic layer 43, it is prevented from escaping from the waveguide 40 as shown at reflection point 42. Advantageously in accordance with our invention, the metallized tapered cone waveguide 40 results in a larger output light spread angle 41 than would be possible from a non-metallized tapered cone waveguide as in FIG. 3 wit reference to the prior art.

Figure 5:
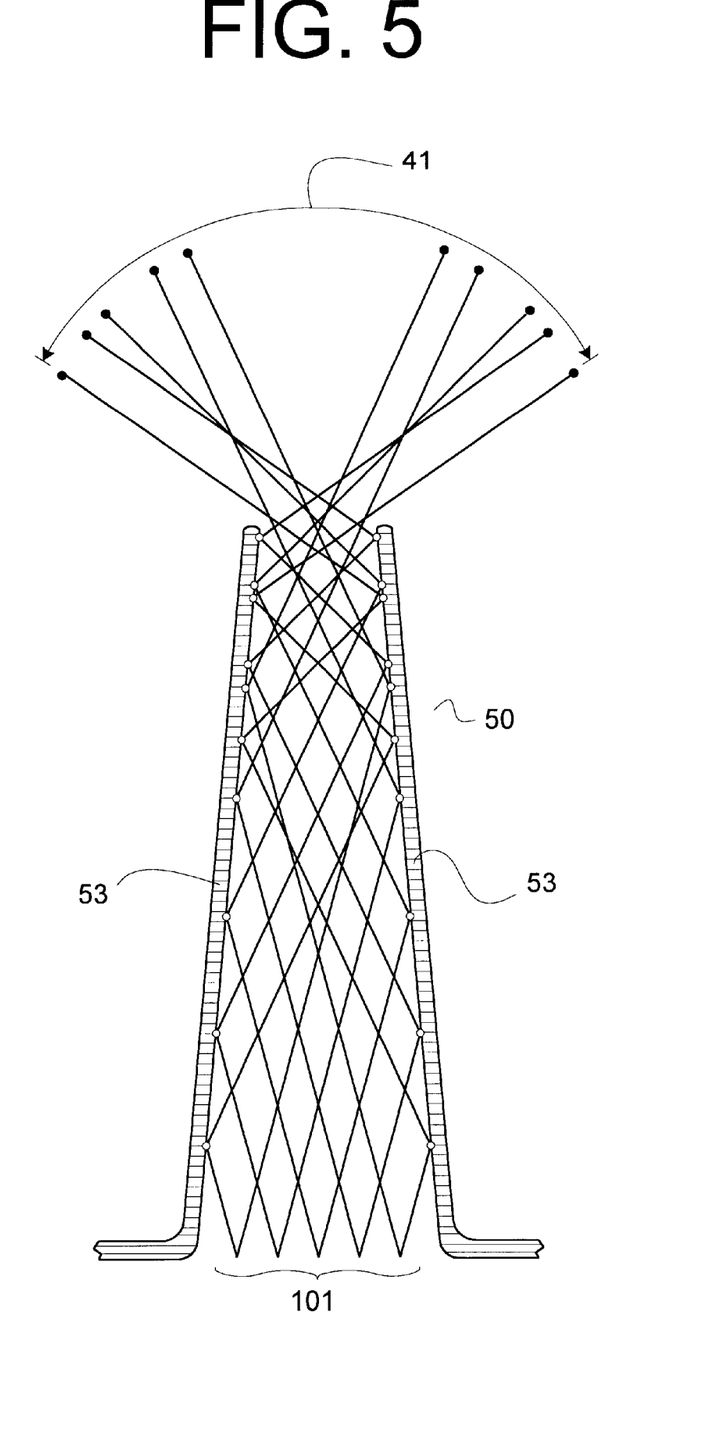
FIG. 5 shows a tapered metallic cone waveguide in accordance with an embodiment of the present invention

A further embodiment of our invention is shown in FIG. 5. In this preferred embodiment the photopolymer, as in Zimmerman, is removed using, for example, an acid wash. The interior of the resultant cone is coated with a protective layer such as polyethylene. Light rays 101 enter the base of the metallic tapered hollow cone waveguide 50, which is disposed on the transparent substrate as shown in FIG. 1. The light rays 101 propagate from the base of the hollow cone 50 to the tip of the hollow cone by reflecting from the tapered metallic walls 53. The input spread angle of the light rays 101 entering the cone is small (approximately 5 degrees) and the output spread angle 41 of the light rays is increased significantly, just as for the metallized tapered cone 40 shown in FIG. 4.

Figure 6:
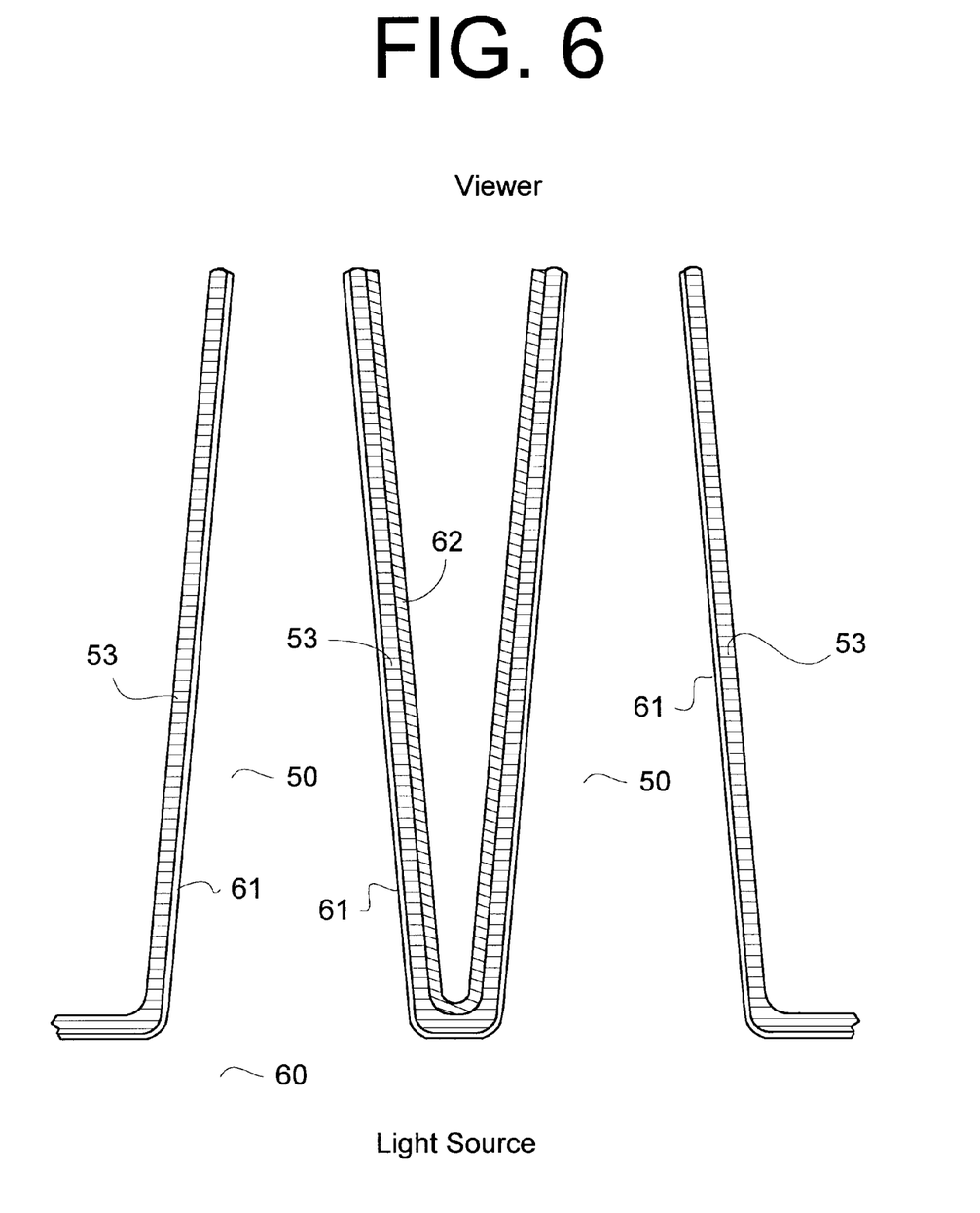
FIG. 6 shows a series of hollow tapered metallic cone waveguides in accordance with an embodiment of the present invention

Referring next to FIG. 6, a portion of an array of metallic cones 60 is shown. The internal surface of each metallic cone 50 is coated with a protective transparent film 61 such as polyethylene. The exterior surface of each metallic cone is coated with a blackened interstitial layer 62 such as flat epoxy paint or a chemical film. In another preferred embodiment, the remaining interstitial space 63 between the cones 50 is filled with a light absorbing material such as lampblack.

Embodiments of our invention may also provide asymmetrical luminance distribution of the output light rays 101 by including asymmetrical scattering at the tapered cone waveguide 40 base or more preferably at the tip (output). This asymmetrical scattering can be achieved by a surface relief hologram such as is offered by Physical Optics Corporation. Advantageously, asymmetrical scattering results in a higher light transmission (approximately 90%) compared to bulk scattering (approximately 50%). The placement only on the tip will provide high ambient light rejection by the blackened exterior 62 of the metallic reflective layer, shown in FIG. 6, or by other black material included in the interstitial region between the cones.

Further embodiments of our invention adjust the viewing angles (light spread angles) in an asymmetrical fashion so that for instance the horizontal viewing angle can be wider than the vertical viewing angle. The viewing angle asymmetry is adjusted by the use of various metallized tapered waveguide shapes, including but not limited to right angle (non-tilted) cones with circular and oval bases and right angle (non-tilted) pyramids with square rectangular, hexagonal, and octagonal bases. Other further embodiments include metallized tapered waveguide shapes comprising tilted cones and pyramids with the bases described above.

Figure 7:
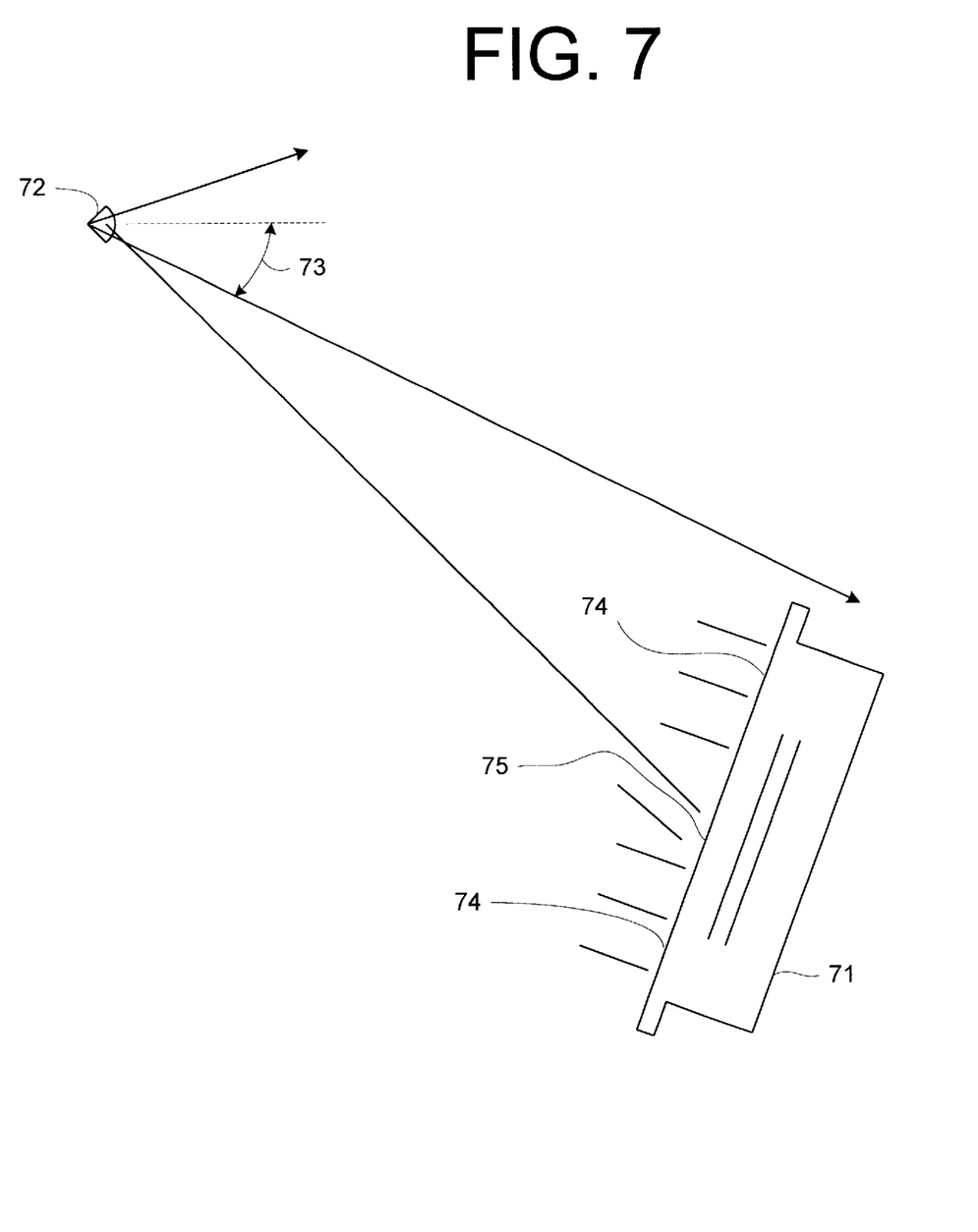
FIG. 7 shows the relative installation position of an aircraft display having a viewing screen in accordance with an embodiment of the present invention.

Referring to FIG. 7, an embodiment of our invention for an aircraft avionics display 71 is shown. Advantageously, metallized cones with various taper angles may be distributed about the viewing area so that, for instance, the middle part of an avionics display that shows warning and caution text could be given a greater vertical-up viewing angle so that the light is directed under pilot night vision goggles (NVG). Aircraft display 71 is illustrated in position and orientation with a pilot's design eye 72. During design of an aircraft cockpit, look down angle 73 is predetermined so that a pilot has adequate visibility over the aircraft's nose. Our invention provides areas of the display with normal priority information 74 that have limited vertical viewing angles so that the pilot is not distracted from looking outside the aircraft and areas of the display with high priority information 75 that have extended vertical viewing angles so that the pilot can be alerted effectively.

The present invention is not to be considered limited in scope by the embodiments described in the specification. Additional advantages and modifications, which will readily occur to those skilled in the art from consideration of the specification and practice of the invention, are intended to be within the scope and spirit of the following claims.

What is claimed is:

1. An aircraft avionics display comprising:
    (a) a display with a direct view light emitting surface, said surface further comprising,
        (i) a first plurality of predefined display areas for high priority information, and
        (ii) a second plurality of predefined display areas for low priority information;
    (b) a viewing angle enhancement screen placed on said display in front of the light emitting surface, having high priority surface areas corresponding to the high priority information display areas of said display and having low priority surface areas corresponding to the low priority information display areas of said display surface;

(c) a plurality of tapered waveguides having various sidewall taper angles disposed on said high priority surface areas of viewing angle enhancement screen and said low priority surface areas of the viewing angle enhancement screen; wherein (d) the sidewall taper angle of said tapered waveguides that are disposed on the high priority surface areas of said viewing angle enhancement screen differs from the sidewall taper angle of said tapered waveguides that are disposed on the low priority surface areas of said viewing angle enhancement screen.

2. The avionics display of claim 1 wherein said tapered waveguides are metallized tapered waveguides.

3. The avionics display of claim 1 wherein said tapered waveguides are hollow metallic tapered waveguides.

4. The avionics display of claim 1 wherein the sidewall taper angle of said tapered waveguides that are disposed on the high priority surface areas of said viewing angle enhancement screen results in a greater vertical viewing angle for the high priority information.

5. A viewing angle enhancement screen for use in association with light producing image display that includes a plurality of areas displaying low priority information and a plurality of areas displaying high priority information, said screen comprising:

(a) a transparent substrate disposed in front of said image display means and having a first surface facing said image display means and a second surface opposing the first surface;

(b) a first plurality of tapered optical waveguides including tapered sides and disposed on the second surface of said transparent substrate and covering a first plurality of areas on said transparent substrate corresponding to the plurality of areas displaying low priority information on said light producing image display;

(c) a second plurality of tapered optical waveguides including tapered sides and disposed on the second surface of said transparent substrate and covering a second plurality of areas on said transparent substrate corresponding to the plurality of areas displaying high priority information on said light producing image display; and (d) a metallic reflective layer coating the upper portion of each of the tapered sides of each of said second plurality of tapered optical waveguides.

6. The viewing angle enhancement screen of claim 5 further comprising:

(a) an asymmetric diffusion element at the light input surfaces of said second plurality of tapered optical waveguides.

7. The viewing angle enhancement screen of claim 5 wherein:

(a) each of said tapered optical waveguides is formed in the general shape of a right angle cone, and (b) the light input surfaces and light output surfaces each of said tapered optical waveguide are generally formed in a shape selected from the group comprising circles, ovals, squares, rectangles, hexagons, and octagons.

8. The viewing angle enhancement screen of claim 5 wherein:

(a) each of said tapered optical waveguides are formed in the general shape of a tilted cone, and (b) the light input surfaces and light output surfaces of said tapered waveguides are generally formed in a shape selected from the group comprising circles, ovals, squares, rectangles, hexagons, and octagons.

9. An aircraft avionics display comprising:

(a) an image display means producing a light output and including a plurality of areas displaying high priority information;

(b) a transparent substrate disposed in front of said image display means and having a first surface facing said image display means and a second surface opposing the first surface;

(c) a plurality of hollow metallic tapered waveguides disposed on the second surface of said transparent substrate and covering a plurality of areas on said transparent substrate corresponding to the plurality of areas displaying high priority information on said light producing image display, each of said hollow metallic tapered waveguides further comprising, (i) an open base adjacent to the second surface of said transparent substrate, (ii) an open tip distal from said open base and having a smaller surface area than said open base, (iii) metallic reflective tapered sides, connected between and forming both an interior closed surface and an exterior closed surface with said open base and said open tip; and (d) wherein the vertical angular distribution of light emerging from the open tips of said waveguides is larger than the angular distribution of light entering the open bases of said waveguides.

10. The aircraft avionics display of claim 9 further comprising:

(a) a protective transparent coating disposed on the interior closed surfaces of said hollow metallic tapered waveguides, and (b) a blackened light absorbing coating disposed on the exterior closed surfaces of said hollow metallic tapered waveguides.

11. The aircraft avionics display of claim 9 wherein:

(a) the hollow metallic tapered waveguides are formed in the general shape of a right angle cone, and (b) the light input surfaces and light output surfaces of said hollow metallic tapered waveguides are generally formed in a shape selected from the group comprising circles, ovals, squares, rectangles, hexagons, and octagons.

\* \* \* \* \*